Figure 1:
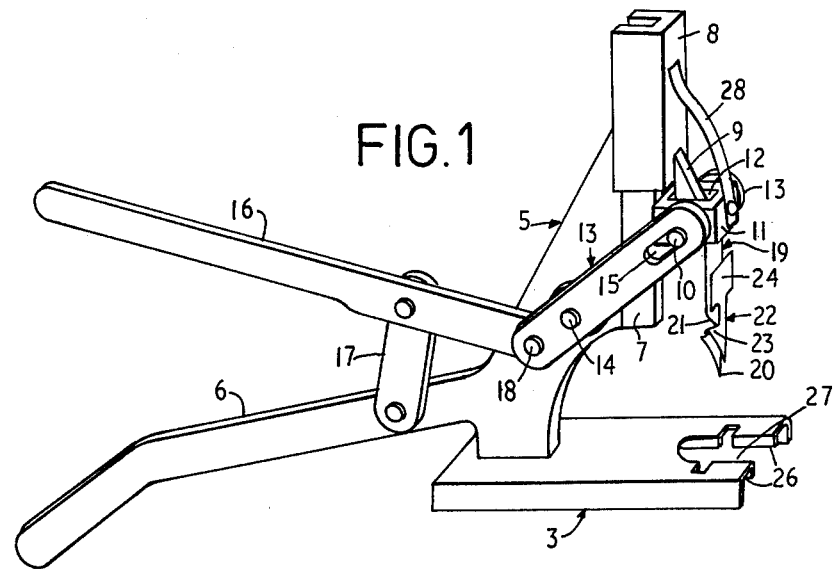

United States Patent [19]

Whiteley

[11] 4,201,214

[45] May 6, 1980

[54] APPLICATORS

[75] Inventor: William B. Whiteley, Via Orange, Australia

[73] Assignee: Marie Ellen Whiteley, Via Orange, Australia; a part interest

[21] Appl. No.: 834,033

[22] Filed: Sep. 16, 1977

[30] Foreign Application Priority Data

Aug. 15, 1977 [AU] Australia .................. PD1238

[51] Int. Cl.² ............... A01K 11/00; A61B 17/00
[52] U.S. Cl. .............................. 128/330; 227/140
[58] Field of Search ............. 128/330, 329 R; 40/301, 40/302, 300; 227/144, 140

[56] References Cited

U.S. PATENT DOCUMENTS

| 3,605,310 | 9/1971 | Brown ........................... 40/301 |
| 3,987,570 | 10/1976 | McMurray et al. ............. 40/301 |
| 4,120,303 | 10/1978 | Villa-Massone et al. ........ 128/330 |
| 4,147,168 | 4/1979 | Hayes et al. .................... 128/329 R X |

FOREIGN PATENT DOCUMENTS

509939 11/1920 France ........................... 40/302

Primary Examiner—Robert W. Michell
Assistant Examiner—Michael H. Thaler
Attorney, Agent, or Firm—Ladas, Parry, Von Gehr, Goldsmith & Deschamps

[57] ABSTRACT

An applicator for attachment of ear tags to animals. The device incorporates a slotted base to which is affixed, at 90°, an elongate guide. A first handle extends from that end of the base opposite the slotted portion thereof and a second handle is pivoted to move from an open to a closed position in a plane through the first handle normal to the plane of the base. A tag carrying spear is movable from a rest position adjacent the guide member and normal to the plane of the base through a path of travel including a first downstroke in a direction normal to the base. At the end of the downstroke the tag anchor portion is wholly through the ear of an animal, which ear is retained adjacent the base during a tagging operation. The spear may then pivot through an arc through the slotted base while being withdrawn from the tagged ear.

12 Claims, 2 Drawing Figures

U.S. Patent  May 6, 1980  4,201,214

APPLICATORS

This invention relates to applicators, and more particularly to applicators for locating ear tags in cattle or other animals.

An ear tag is usually located in an animal by virtue of attachment of the ear tag to a hand-held applicator having a sharpened or spear-like end. This sharpened end of the applicator is forced through an ear with the tag mounted on the applicator. The tag normally comprises an anchor portion which may, for example, be triangular with the apex of the triangle being the first portion of the tag inserted through the ear. Depending from the base of the anchor portion of the ear tag is a narrow connecting member which is joined at its opposite end to a generally rectangular portion of the tag which portion is usually impressed with a number or like identifying characteristic. When the applicator is withdrawn from the ear the anchor portion of the ear tag is intended to catch on the rear portion of the ear and to flare so that the anchor portion of the ear tag remains behind the ear, the connecting member thereof extends through the hole in the ear through which the applicator is withdrawn and the rectangular member remains at the front of the ear.

However, difficulties arise in practice in that on occasions the animal jerks its head when the applicator pierces its ear, the result being that the ear tag is either not forced sufficiently through the ear before the applicator is withdrawn or is, perhaps, withdrawn in-toto with the applicator. Thus the animal is left with a hole in its ear and no tag.

This invention relates to a hand-held applicator device for application of ear tags to animals, which applicator is considered capable of achieving considerably improved application results.

The gist of this invention is the realisation of the fact that the rigidity of the conventional hand-held spear member seriously limits the ease with which such spear member may be withdrawn from the ear of an animal into which it has been inserted, particularly where an animal moves its head and its ear to any substantial degree. The relationship between the inserted spear and the animal's ear is a comparatively inflexible one and this places limitations on the freedom of the tag to realise full insertion of its anchor portion to the rear of the animal's ear (without such full insertion of the anchor portion the tag will withdraw with the spear) and, given a full insertion of the anchor portion through the ear, to allow detachment of the anchor portion and flaring thereof relative to the spear before spear withdrawal. Failure of the tag anchor portion to flare before spear withdrawal will also result in withdrawal of the tag with the spear.

This invention in one broad form provides an applicator for an animal ear tag said applicator comprising a spear member and a handle to which the spear member is pivotally attached so that when the spear member is inserted through an animal's ear such that the anchor portion of the tag is fully through the ear, the pivot between the spear member and the handle is located forwardly of the ear.

In a further form the invention comprises first and second handles, the second handle being movable in a plane towards and away from the first handle; a slotted base member to which the first handle is rigidly connected; a rigid member having a longitudinal surface in a plane substantially normal to the plane of said base member; a spear member adapted for mounting thereon of a tag for application to an animal's ear, said spear member being adapted to travel lengthwise of said rigid member, connecting said second handle and said spear member such that when said second handle is moved towards said first handle said spear member is forced to move relative to said rigid member towards said base member, and wherein the slotted portion of said base member is so configured that the spear carrying the ear tag may enter the slot and may pivot therein relative to the rigid guide member.

It is preferred that the slotted portion of the base member should also be adapted, as with buffers or the like so that the spear member may pass therethrough without contacting the base member or buffers but so that the tag is positively detached from the spear by virtue of a passing abutment between the tag and the buffers as the spear member pivots in the slot in the base member.

It is further preferred that the first handle, the base member and the rigid guide member along which the spear member travels in down and up strokes form part of a unitary rigid frame and that the actuating link means between the second arm and the spear should have a fulcrum pivoted fixedly to said frame.

Figure 2:
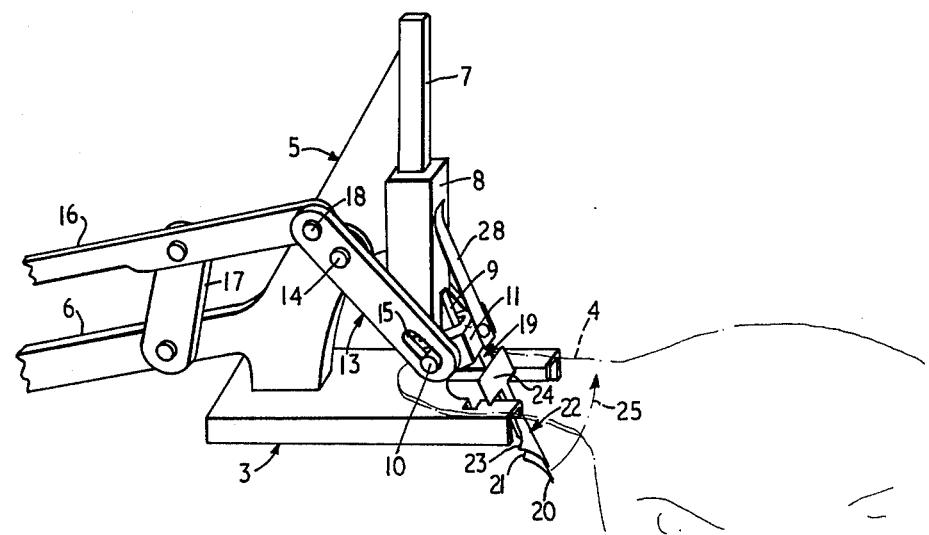

By way of example only, a preferred embodiment of the applicator according to this invention is described herein with reference to the accompanying drawings wherein:

FIG. 1 is a perspective view of the applicator in its inoperative rest position showing a tag secured thereto, and, FIG. 2 is a similar perspective view showing the tag as it is being driven through the ear with the piercing member commencing to swing clear.

The applicator is provided with a rectangular base 3 on which the animal's ear 4 can be placed prior to piercing. A guide member 5 extends vertically from the rear end of the base 3 and a first handle 6 extends integrally and rearwardly from said guide 5. A guide way 7 is formed on the guide member 5 and a sliding block 8 is displaceably secured upon the guide way 7. A tongue 9 extends downwardly from the block 8 and carries a pivot pin 10. A cross head block 11 is medially and pivotally mounted on the pin 10 with the tongue 9 located in a central slot 12 in said cross head 11.

Two actuating links 13 are pivotally secured at 14, one on either side of the guide member 5. Elongated slots 15 in one free end of each link 13 engage the ends of the pin 10. A second handle 16 is pivotally secured to the first handle 6 by means of a link 17, and the inner end of said handle 16 is pivotally secured at 18 to the other free end of one of the links 13.

A piercing member 19 is secured to the underside of the cross head 11. The member has a cutting point 20 and a recess 21.

Before use, a tag 22 is secured to the piercing member 19 by bending lugs 23, formed integrally with said tag, into the recesses 21. The tag 22 also incorporates an upper rectangular portion 24 upon which the necessary indicia is printed.

Prior to use the mechanism is in the position shown in FIG. 1 wherein the cross head 11 is closely positioned against the guide way 7 so that it cannot rotate about the pivot 10. The piercing member 19 is thus held in a vertical position. The animal's ear 4 is placed on the base 3 as shown in FIG. 2 and the handle 16 is depressed so that the member 19 descends and its point pierces the ear 4 and carries the tag lugs 23 through said ear.

At this point the cross head 11 has dropped clear of the guide way 7 so that it can pivot upon the pin 10 in the direction of the arrow 25. If the animal jerks its head the movement will not tear the ear 4 because the piercing member 19 will swing towards a horizontal position and allow the ear to slide off.

Ramps 26 secured to the sides of an aperture 27 in the base 3, below the piercing member 19, now strike the tag lugs 23 and half retain the lugs within the ear 4 as the piercing member 19 is withdrawn.

In order to assist the piercing member 19 to return to its original position a leaf spring 28 secured thereto engages the block 8 to bias said member 19 towards the vertical position.

What I claim is:

1. An ear tag applicator comprising first and second handles, means connecting the second handle to the first handle so that the second handle is movable in a plane towards and away from said first handle; a slotted base member to which said first handle is rigidly connected; a rigid guide member having a longitudinal surface in a plane substantially normal to the plane of said base member; a spear member adapted for mounting thereon of a tag for application to an animal's ear, said spear member being adapted to travel lengthwise of said rigid guide member; pivot means permitting said spear member to pivot relative to said guide member, means connecting said second handle and said spear member such that when said second handle is moved towards said first handle said spear member is forced to move relative to said rigid guide member towards said base member and wherein the slotted portion of said base member is so configured that the portion of the spear member carrying the ear tag may enter and pivot in said slot relative to said guide member at the end of the downstroke of said spear member relative to said rigid guide member.

2. An ear tag applicator as defined in claim 1, wherein said connecting means comprises an actuating link pivoted to both said second handle and said spear member, the means permitting said spear member to pivot relative to said guide member also permitting said spear member to pivot relative to said actuating link.

3. An ear tag applicator as defined in claim 1 wherein said guide member is rigidly fixed to the end of said base member opposite the slotted portion thereof and wherein said first handle is fixed to said guide member and extends in a direction away from the slotted portion of said base.

4. An ear tag applicator as defined in claim 1 further comprising a peripheral guideway disposed on an edge of said guide member and extending in a direction substantially normal to the plane of said base.

5. An ear tag applicator as defined in claim 1 wherein said spear member is pivoted to a tongue extending from a sliding block displaceably secured on said peripheral guideway.

6. An ear tag applicator as defined in claim 5 wherein said spear member comprises a cross head pivoted to said tongue and a piercing member fixed to said cross head, said piercing member being adapted to carry said tag.

7. An ear tag applicator as defined in claim 6 wherein said actuating means comprises a pair of parallel links, one disposed on either side of said guide member, slotted at their ends opposite their pivots with said second handle to accommodate the pivot pins about which said cross head pivots.

8. An ear tag applicator as defined in claim 1 further comprising buffer members disposed on opposite sides of the slot in said base and configured to allow the tip of said spear to pass therethrough unhindered but to abut against the tag carried by said spear to assist in dislodgment of the tag anchor from said spear.

9. An ear tag applicator as defined in claim 8 further comprising a return spring adapted to return said spear member to its up-stroke rest location after a tag application.

10. An ear tag applicator as defined in claim 9 wherein said return spring is secured to said spear member and to said sliding block.

11. An applicator for an animal ear tag, comprising first and second handles, means connecting the second handle to the first handle so that the second handle is movable in a plane towards and away from said first handle, actuating means pivoted to said second handle and being adapted to move a spear member, an apertured base plate fixed rigidly against relative movement with respect to said first handle, said spear member being shaped to carry a tag and being pivoted to said actuating means, and a guide member for guiding said spear member through said apertured base plate when said handles are pivoted towards each other, said guide member having a guide surface disposed substantially normal to the plane of the base plate and fixed rigidly against movement relative to the base plate, and the pivot between the spear member and the actuating means permitting the spear member at the end of its movement towards the base plate to pivot in the aperture in said base plate away from said guide surface.

12. An applicator as defined in claim 11, wherein said guide member is rigid and has a longitudinal surface in a plane substantially normal to the plane of said base plate and a carrier block shaped to slidingly traverse said rigid guide member and wherein said spear member is pivoted by the same pivot to said actuating means and to a tongue member fixed to and extending from said carrier block.

* * * * *